Patented Dec. 18, 1945

2,391,179

UNITED STATES PATENT OFFICE 2,391,179

FLUORINE CONTAINING AZO COMPOUNDS

James G. McNally and John R. Byers, Jr., Rochester, N. Y., assignors to Eastman Kodak Company, Rochester, N. Y., a corporation of New Jersey No Drawing. Application October 22, 1942,
Serial No. 462,958

6 Claims. (Cl. 260—187)

This invention relates to new azo compounds and their application for the dyeing of organic derivatives of cellulose.

We have found that navy blue to black shades which can be discharged white can be obtained on organic derivatives of cellulose by dyeing them with a dye having the formula:

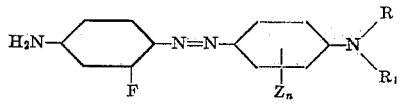

wherein Z stands for a member selected from the group consisting of a halogen atom, an acylamino group, an alkyl group and an alkoxy group, $n$ stands for a member selected from the group consisting of 0, 1 and 2 and R and $R_1$ each stands for a member selected from the group consisting of an alkyl group and a hydroxyalkyl group, diazotizing the dye on the fiber and developing the diazotized dye with 2-hydroxy-3-naphthoic acid. The dyeing process just described has been found particularly of value in connection with the dyeing of cellulose acetate silk and especially so for the production of black shades on this material. Our invention includes both the monoazo and disazo dye compounds referred to above.

It is an object of our invention to provide new azo compounds suitable for the dyeing of organic derivatives of cellulose, especially cellulose acetate silk. Another object is to provide dyeings on material made of or containing an organic derivative of cellulose which are of good fastness to light and washing. A further object is to provide cellulose acetate silk textile materials dyed a black shade of excellent fastness to light and washing. Other objects will hereinafter appear.

Typical organic derivatives of cellulose, which may be dyed with the azo compounds of our invention, include the hydrolyzed as well as the unhydrolyzed cellulose organic acid esters such as cellulose acetate, cellulose formate, cellulose propionate or cellulose butyrate and the hydrolyzed as well as the unhydrolyzed mixed oragnic acid esters of cellulose such as cellulose acetate-propionate, cellulose acetate-butyrate and the cellulose ethers such as methyl cellulose, ethyl cellulose or benzyl cellulose.

We have found that the azo dye compounds having the formula:

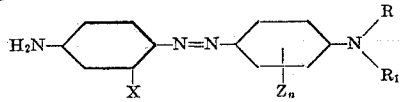

wherein X stands for chlorine, bromine or iodine and Z, R, $R_1$ and $n$ have the meaning previously assigned to them when applied to cellulose acetate textile fabrics and developed with 2-hydroxy-3-naphthoic acid yield dyeings which have the peculiar property of "browning." All possible dyes of the above formula have not, of course, been prepared and tested by us but we have so tested a considerable number of such dyes and have found that, without exception, they have the property of "browning." That is, they turn brownish when steamed or pressed while wet with a hot iron.

The monoazo dye compounds of our invention containing a fluorine atom instead of a chlorine, bromine or iodine atom, however, do not have the undesirable property of "browning." Thus, because they do not "brown," the navy-blue to black dyeings obtained with our dye compounds may be steamed or pressed while wet with a hot iron without detriment to the dyeing. This constitutes an important and unexpected advantage which could not have been predicted.

The free amino dye compounds of our invention combine good speed of dyeing with good exhaustion. Thus, these dye compounds dye rapidly and evenly at 80–85° C. with good exhaustion. This property makes them valuable for box dyeing. Certain members of this series also have good speed of dyeing and exhaustion at temperatures of 60–65° C. and these compounds are of value for jig dyeing operations. Further, these free amino dye compounds have excellent solubility in water and do not tend to form gummy deposits. When diazotized on the fiber and coupled with 2-hydroxy-3-naphthoic acid, desirable navy blue to black shades of excellent fastness to light and washing, readily dischargeable to white, are obtained. The properties enumerated which are possessed by the dye compounds of our invention make them of unusual industrial importance.

In the initial dyeing operation the free amino dye compounds can be applied in concentrations, for example, from ¼% to 3% by weight of the dye to the material undergoing dyeing. Higher concentrations can be employed if desired but are ordinarily unnecessary. Pretty orange-yellow dyeings are obtained in this initial dyeing operation. For the development operation following the diazotization of the free amino dye compound on the fiber, an excess of 2-hydroxy-3-naphthoic acid is ordinarily employed. The intensity of shade obtained will vary depending upon the amount of the free amino dye absorbed by the fiber in the initial dyeing operation. With concentrations up to about 1% by weight, navy blue shades are obtained while, with concentrations ranging from about 1% upwards by weight, black shades are obtained. From this it is seen that the intensity of the shade increases with an increase in the amount of free amino dye applied to the fiber. Thus, with low concentrations, navy blue shades can be obtained, while with high concentrations deep black shades are obtained.

The following examples illustrate the invention:

*Example 1.—Preparation of 4-amino-2-fluorobenzeneazodi-β-hydroxy ethylaniline*

15.6 grams of 1-amino-2-fluoro-4-nitrobenzene are slurried in a mixture consisting of 30 cc. of hydrochloric acid (specific gravity 1.19) and 50 cc. of water. When all of the lumps have been broken up and the amine compound is in solution, the reaction mixture is cooled to a temperature approximating 0–5° C. by the addition of ice, for example, following which the amine compound is diazotized by adding quickly a concentrated solution of 7 grams of sodium nitrite in water. The diazotization is carried out while maintaining a temperature of 0–5° C. Upon completion of the diazotization reaction which requires approximately one hour, the mixture is filtered to remove any aminoazo compound formed during the diazotization reaction. The volume of the filtrate is about 250 cc.

18.1 grams of di-β-hydroxyethylaniline are dissolved in a mixture consisting of 15 cc. of hydrochloric acid (specific gravity 1.19) and 150 cc. of water. The resulting solution is cooled to a temperature approximating 0–10° C. by the addition of ice. To this solution is added the diazonium solution prepared above at a fairly rapid rate with good stirring while maintaining the reaction mixture in a cooled condition. Coupling takes place and a precipitate which is the hydrochloride of the dye 4-nitro-2-fluorobenzeneazodi-β-hydroxyethylaniline. After standing for about 30 minutes the reaction mixture is slowly and carefully made just alkaline to litmus by the addition of sodium carbonate. By this procedure the dye compound is brought down in finely divided state and is in condition for the ensuing reduction wherein the nitro group is reduced to an amino group.

The slurry formed above is heated to 65–70° C. and a solution of 50 grams of 60% fused sodium sulfide in 100 cc. of hot water, filtered to free it from metallic sulfides, is added, all at once, with stirring. A temperature of about 65–70° C. is maintained during the addition of the sodium sulfide solution and during the ensuing reduction which requires about one hour. The red-brown slurry resulting upon addition of the sodium sulfide solution changes color to a dark brown and finally to a lighter red-brown at which point the desired dye compound begins to crystallize from solution. After completion of the reduction operation, the heating and stirring are stopped and the reaction mixture is allowed to cool to room temperature. The reaction mixture is then filtered, washed clean of sodium sulfide with cold water and dried at room temperature. The foregoing example is typical of the manner of preparation of the free amino monoazo dye compound of our invention and, following the procedure described in the example, any of the free amino compounds having the formula indicated hereinbefore can be prepared.

These free amino dye compounds are ordinarily applied to the material undergoing coloration in the form of an aqueous suspension which can be prepared by grinding the dye to a paste in the presence of soap or other suitable dispersing agent and dispersing the resulting paste in water. Dyeing operations can, in the case of cellulose acetate silk, for example, be conducted at temperatures of 70–85° C., although, as indicated hereinbefore, in some cases somewhat lower temperatures can be used. Similarly, somewhat higher temperatures than those indicated can likewise be employed although these higher temperatures are ordinarily unnecessary. In accordance with the usual dyeing practice, the material to be dyed will ordinarily be added to the dyebath at a temperature lower than that at which the main portion of the dyeing is to be effected. A temperature approximating 45–55° C., for example, following which the temperature of the dyebath is raised to that selected for carrying out the dyeing operation. Suitable dispersing or solubilizing agents that can be employed for preparing suspensions of the dye include soap, sulforicinoleic acid and sulfonated oleic, stearic or palmitic acid or salts thereof such, for instance, as the sodium or ammonium salts.

The following example illustrates one satisfactory way in which the azo dyes of our invention containing a free amino group may be applied to cellulose acetate fibers.

*Example A*

1.5 parts of 4-amino-2-fluorobenzeneazodi-β-hydroxy-ethylaniline are finely ground with soap and dispersed in 3000 parts of water. The dispersion thus prepared is heated to a temperature approximating 45° C. and 100 parts of cellulose acetate in the form of fabric or yarn, for example, are added to the dyebath after which the temperature is raised to 75–80° C. and the material worked for 15 minutes at this latter temperature. Upon completion of the dyeing operation, the cellulose acetate material is removed, washed with soap and rinsed well with water. It will be found to be dyed a pleasing orange-yellow shade.

*Diazotization and development of the dye*

After the material has been rinsed after dyeing it is diazotized in a bath made up as follows: For each 10 grams of cloth, 1 gram of sodium nitrite is dissolved in a mixture containing 2 grams of concentrated hydrochloric acid (35%) and 300 cc. of water. The diazotization treatment is given for 30–45 minutes at a temperature of about 20° C. Upon completion of the diazotization reaction, the fabric is removed and thoroughly rinsed with water following which it is ready for development.

Following the diazotization treatment the material is developed, preferably immediately, in a bath made up as follows: For every 10 grams of cloth, 10 cc. of a 5% stock solution of 2-hydroxy-3-naphthoic acid and 1 cc. of glacial acetic acid are added to 300 cc. of water. (The stock solution of 2-hydroxy-3-naphthoic acid is made by dissolving 10 grams of 2-hydroxy-3-naphthoic acid in 100 cc. of 5% NaOH and then adding 100 cc. of water.) The cellulose acetate cloth from the diazotization treatment is entered in the developing bath at 30° C. and the temperature is gradually raised to 60° C. over a 30 minute period and the bath is kept at this temperature for an additional 30 minutes. Following this treatment, the cellulose acetate material is removed, washed well with water and dried.

By the dyeing operations just described, a deep black shade which possesses excellent fastness to light and washing is obtained. As previously explained, by the use of lesser or greater amounts of the dye compound containing a free amino group lighter or darker shades can be obtained. The dyeings obtained in accordance with our invention are readily discharged to substantially a pure white by the usual reduction discharges such as, for instance, the monozinc salt of formaldehyde sulfoxylic acid (Rongalite), sodium hydrosulphite and sodium formaldehyde sulphoxylate.

The developing bath made up as described above has a pH value of 4.0. By increasing the amount of acetic acid added the pH will be lowered and the shade obtained on the fabric will be greener. Raising the pH by decreasing the amount of acid added results in a redder shade being obtained. It will be understood that the dyeing operations just described are applicable to the other dye compounds of our invention described hereinafter and are not limited to the particular monoazo and disazo dyes used in these dyeing operations. The same general results are obtained regardless of the particular dye compound used.

The monoazo dye compounds of our invention containing a free amino group and having the formula given hereinbefore can be prepared following the general procedure given in connection with the preparation of 4-amino-2-fluorobenzeneazodi-β-hydroxyethylaniline. That is, diazotized 1-amino-2-fluoro-4-nitrobenzene is coupled with a coupling component having the formula:

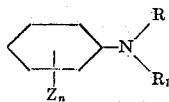

wherein R, R₁, Z and n have the meaning previously assigned to them and the nitro group of the monoazo dye compound thus obtained is reduced to an amino group.

Monoazo dye compounds of our invention which can be prepared in accordance with the procedure described hereinbefore include:

1. 4-amino-2-fluorobenzeneazomethyl, β-hydroxyethylaniline
2. 4-amino-2-fluorobenzeneazoethyl, β-hydroxyethylaniline
3. 4-amino-2-fluorobenzeneazoethyl, β,γ-dihydroxypropylaniline
4. 4-amino-2-fluorobenzeneazoethyl, β,γ-dihydroxypropyl-m-toluidine
5. 4-amino-2-fluorobenzeneazoethyl, β,γ-dihydroxypropylcresidine
6. 4-amino-2-fluorobenzeneazodi-β-hydroxyethyl-m-chloroaniline
7. 4-amino-2-fluorobenzeneazoethyl, β,γ-dihydroxypropyl-m-chloroaniline
8. 4-amino-2-fluorobenzeneazodi-β-hydroxyethyl-m-fluoroaniline
9. 4-amino-2-fluorobenzeneazoethyl, γ-hydroxypropyl-m-bromoaniline
10. 4-amino-2-fluorobenzeneazodi-β-hydroxyethyl-m-iodoaniline
11. 4-amino-2-fluorobenzeneazodimethyl-m-chloroaniline
12. 4-amino-2-fluorobenzeneazodi-β-hydroxyethyl-2-methoxy-5-acetaminoaniline
13. 4-amino-2-fluorobenzeneazo-β-hydroxyethyl-β,γ-dihydroxypropylaniline
14. 4-amino-2-fluorobenzeneazoethyl, pentaerythrityl-o-anisidine
15. 4-amino-2-fluorobenzeneazodimethylaniline
16. 4-amino-2-fluorobenzeneazomethyl, ethylaniline
17. 4-amino-2-fluorobenzeneazodi-β-hydroxyethyl-m-ethylaniline
18. 4-amino-2-fluorobenzeneazopropyl, β-hydroxyethyl-m-propionylaminoaniline
19. 4-amino-2-fluorobenzeneazobutyl, β,γ-dihydroxypropylaniline
20. 4-amino-2-fluorobenzeneazodi-β-hydroxyethyl-m-toluidine
21. 4-amino-2-fluorobenzeneazomethyl, β,γ-dihydroxypropylaniline As will be understood, the disazo dye compounds of our invention can be prepared by coupling the diazotized monoazo dye compounds of the invention with 2-hydroxy-3-naphthoic acid. Normally, the disazo dye compound is formed on the fiber in the manner described hereinbefore. Where it is desired to obtain the dye compound per se, the diazotized monoazo dye compound is coupled with a slight excess of 2-hydroxy-3-naphthoic acid over that theoretically required to combine with the diazotized monoazo dye compound.

In order that our invention may be clearly understood, the preparation of 1-amino-2-fluoro-4-nitrobenzene is described hereinafter. Briefly, this compound is obtained by first preparing, 1,2-difluoro-4-nitrobenzene and converting this compound to 1-amino-2-fluoro-4-nitrobenzene.

*Preparation of 1,2-difluoro-4-nitrobenzene*

250 cc. of concentrated sulfuric acid (specific gravity 1.84) and 220 grams of concentrated nitric acid (specific gravity 1.42) are mixed together in a suitable receptacle, and cooled to 0° C. While holding the temperature between 0° and 5° C., 62 grams of o-difluorobenzene are stirred in dropwise during a period of 45 minutes. After the addition of the o-difluorobenzene is complete, the temperature of the reaction mixture drops and the mixture is stirred for one hour at −10° C. Stirring is continued for an additional three hours while the temperature is permitted to rise to 14° C. following which the temperature of the reaction mixture is gradually raised to 25° C. over a 30 minute period and stirring is continued at this temperature for another 30 minutes. 625 grams of cold water are then added, the temperature rising to 40–50° C. The oily reaction product is separated from the reaction mixture by extraction with carbon tetrachloride, two or more such separations being employed. The combined carbon tetrachloride liquors are washed with water, then with a dilute sodium bicarbonate solution and finally with water. After the final washing the carbon tetrachloride liquors are dried with calcium chloride overnight following which the carbon tetrachloride is removed by distillation at atmospheric pressure at a temperature up to 100° C. The pressure is now reduced in the still and distillation continued taking a cut up to 90° C. at 30 millimeter pressure. At this point the receiver is changed and a further fraction distilling at 80–81° C. at 14 millimeters pressure is fractionated off. This fraction consisting almost exclusively of 1,2-difluoro-4-nitrobenzene is an oily liquid weighing 190 grams or 85.6% of the theoretical amount of 222 grams.

*Preparation of 1-amino-2-fluoro-4-nitrobenzene*

32 grams of 1,2-difluoro-4-nitrobenzene and 140 cc. of 28% aqueous ammonia are heated together for 6 hours at 150–160° C. in a steel liner of a shaking autoclave. The mixture is cooled while shaking to room temperature and then the reaction mixture consisting of water, ammonia and solid is poured out of the autoclave and the liner is washed with water. The crude product is recovered by filtration and dissolved in methyl alcohol. The methyl alcohol solution is filtered and the filtrate is cooled in an ice salt bath while water is slowly added to the alcoholic solution to effect precipitation of the 1-amino-2-fluoro-4-nitrobenzene. Upon filtration and drying, 26.4 grams of 1-amino-2-fluoro-4-nitrobenzene are obtained, which is 90% of the theoretical amount of 30.8 grams. The melting point is 135–136° C.

The majority of the coupling components which can be employed in the preparation of the azo dye compounds of our invention are known compounds. However, as the preparation of certain of these compounds may not be described in the art, we would note that these compounds, in general, are prepared by subjecting compounds having the formula:

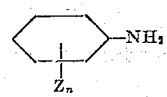

wherein Z and $n$ have the meaning previously assigned to them to appropriate treatment to replace the hydrogen atoms of the free amino group with alkyl, and hydroxyalkyl groups. The manner of introducing these latter groups is so well known to the art that it need not be described here.

It will be understood that while the application of our dye compounds has been illustrated primarily in connection with the dyeing of cellulose acetate they are, as has been stated, suited for the dyeing of organic derivatives of cellulose in general. Thus, other organic derivatives of cellulose may be dyed using the method illustrated in connection with the dyeing of cellulose acetate.

We claim:

1. The azo dye compounds having the formula:

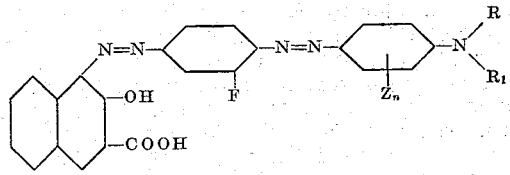

wherein Z stands for a member selected from the group consisting of a halogen atom, lower aliphatic acylamino group, a lower alkyl group and a lower alkoxy group, $n$ stands for a member selected from the group consisting of 0 and 1, and R and R₁ each stands for a member selected from the group consisting of a lower alkyl group and a lower hydroxyalkyl group.

2. The azo dye compounds having the formula:

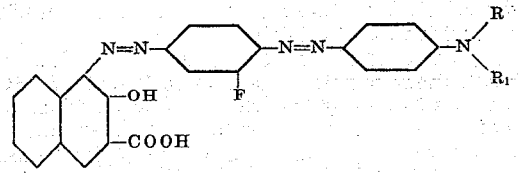

wherein R and R₁ each stands for a member selected from the group consisting of a lower alkyl group and a lower hydroxyalkyl group.

3. The azo dye compound having the formula:

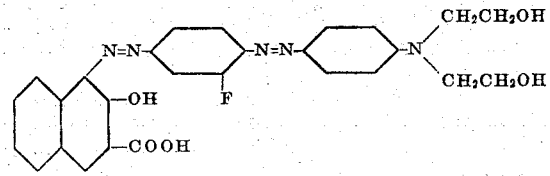

4. Organic derivative of cellulose textile fibers colored a dischargeable shade by a dye having the formula:

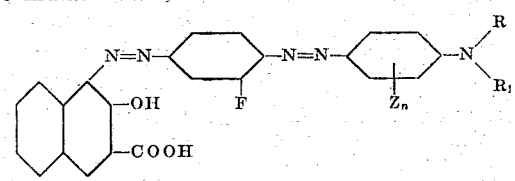

wherein Z stands for a member selected from the group consisting of a halogen atom, a lower aliphatic acylamino group, a lower alkyl group and a lower alkoxy group, $n$ stands for a member selected from the group consisting of 0 and 1, and R and R₁ each stands for a member selected from the group consisting of a lower alkyl group and a lower hydroxyalkyl group.

5. A cellulose acetate dyed a dischargeable shade by a dye having the formula:

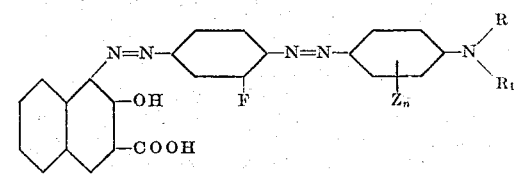

wherein Z stands for a member selected from the group consisting of a halogen atom, a lower aliphatic acylamino group, a lower alkyl group and a lower alkoxy group, $n$ stands for a member selected from the group consisting of 0 and 1, and R and R₁ each stands for a member selected from the group consisting of a lower alkyl group and a lower hydroxyalkyl group.

6. A cellulose acetate textile material colored a dischargeable shade by the dye having the formula:

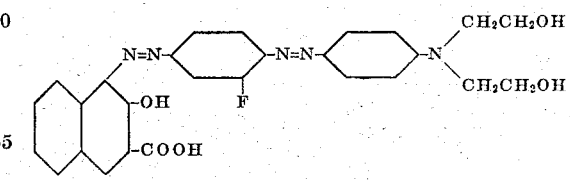

JAMES G. McNALLY.
JOHN R. BYERS, Jr.